July 27, 1954     R. McFARLAND, JR     2,684,829
VALVE DIAPHRAGM

Filed March 7, 1951     2 Sheets-Sheet 1

INVENTOR.
ROLLAND McFARLAND JR.
BY Edward H. Lang
ATTORNEY.

July 27, 1954

R. McFARLAND, JR 2,684,829

VALVE DIAPHRAGM

Filed March 7, 1951

INVENTOR.
ROLLAND McFARLAND JR.
BY
Edward H. Lang

ATTORNEY

Patented July 27, 1954

2,684,829

UNITED STATES PATENT OFFICE 2,684,829

VALVE DIAPHRAGM

Rolland McFarland, Jr., Crystal Lake, Ill., assignor to Hills-McCanna Company, Chicago, Ill., a corporation of Illinois Application March 7, 1951, Serial No. 214,237

15 Claims. (Cl. 251—331)

This invention relates to diaphragm valves and to diaphragms therefor. The invention is more particularly concerned with a fluted or corrugated diaphragm construction suitable for flexible materials such as rubber and synthetic elastomers, with the invention and details of design aimed at producing a diaphragm for a diaphragm valve such that the improved design will eliminate difficulties that are now inherent, to a greater or less extent, in conventionally designed diaphragms utilized for similar purposes in diaphragm valves. The invention is more particularly directed to diaphragms for use in weir type valves of the Saunders type, as exemplified by Patents Nos. 1,855,991 and 2,054,340, in which the diaphragm is adapted to be depressed against a raised weir, across the fluid passageway through the valve, in order to close the valve.

Conventional diaphragms for valves of the above type are made of reinforced rubber, synthetic elastomers or elastisols, which diaphragms are flexible and capable of being bent, stretched, or distorted without immediate injury to the diaphragm. These diaphragms are made with a smooth, continuous deflecting bowl, adapted to be deflected downwardly, or upwardly, as the valve is opened or closed. Such materials as have been previously used for making these diaphragms have inherent defects in the material, such as the property of cold flow or continuous deformation under load, which properties continuously tend to work against proper diaphragm function, shorten diaphragm life, and eventually destroy the proper physical and mechanical action of the diaphragm.

An object of this invention is to provide an improved diaphragm for use in connection with diaphragm type valves.

Another object of the invention is to provide a valve diaphragm construction which will permit more proper and effective use of flexible materials such as rubber, synthetic elastomers and highly plasticized resin compositions (elastisols).

A further object of the invention is to provide an improved diaphragm capable of being made of the aforesaid materials and of being used in services to which these materials are best suited from the standpoint of resistance to chemical attack and to the temperature conditions encountered.

Still another object of the invention is to provide an improved diaphragm valve.

Other objects of the invention will become evident from the following description and accompanying drawing of which Figure 1 is a plan view, looking at the upper face of the diaphragm;

Figure 1:
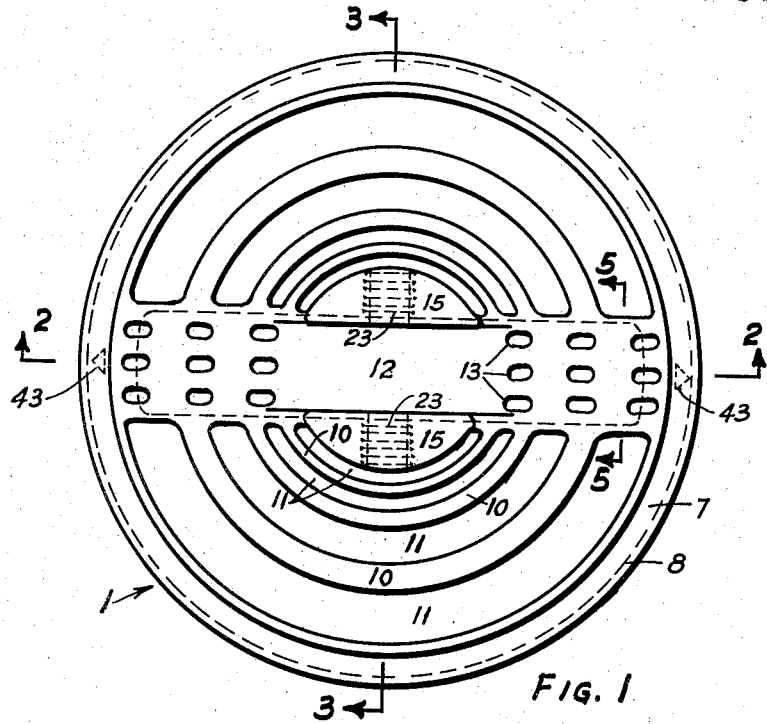

Referring to the drawings the diaphragm indicated generally by the numeral 1 is shown with a circular periphery but it may be shaped to fit any particular style valve. For example, the periphery may be rectangular with rounded corners, or it may be oval. The diaphragm is formed with a thick fishtailed edge portion 6, 7 having a relieved or dished edge 8. The edge portion 6, 7 joins a bowl shaped section 9, the thickness of the diaphragm at the line of jointure being somewhat less than that of the edge portion. The top or dry side of the bowl section is relieved, fluted or corrugated to form a series of alternate concentric crests 10 and flutes or hollows 11. The arc-shaped crests and hollows merge into a wide strip 12 (Figure 1) running through the middle of the diaphragm which is adapted to overlie the weir of the valve in connection with which the diaphragm is to be used. The upper or dry side of strip 12 is smooth except for a series of rows of oval-shaped recesses or depressions 13 lying between the opposing ends of the arc-shaped corrugations. As shown in the drawing the strip 12 has 6 rows of recesses 13 with 3 recesses in each row. However, by making the recesses larger or smaller the number of rows of recesses and the number of recesses in each row can be decreased or increased, respectively.

The diaphragm is formed of a plurality of layers of rubber, synthetic elastomer or plasticized resin, with alternate layers of woven fabric such as cotton duck therebetween for reinforcement. The bottom or wet side 14 of the diaphragm is not corrugated but has a smooth contoured surface over-all.

Two opposite upright sections 15 are formed integrally with the upper layer of the diaphragm, one on each side of strip 12, in the center of the diaphragm. The outer faces of sections 15 are arcuate, conforming to the shape of the corrugations, but the opposing inner faces are flat.

In building the diaphragm a ply of woven fabric 16 such as cotton duck 17 is cemented to a bottom smooth calendered layer of rubber or other elastomer 17 having a thickness of about 1/8 to 5/32 inch for a diaphragm of the size illustrated (two inch valve). A thin layer of calendered rubber is cemented to the cotton duck ply 17. A strip of cotton duck 18 is cemented to the thin layer of calendered rubber and positioned to lie directly over the valve weir when assembled in a finished valve. An annular ply 19 of cotton duck is also cemented to the upper surface of the thin calendered layer of rubber at the edge position of the diaphragm. A second thin layer of calendered rubber is cemented above ply 19 and strip 20. A second annular ply 21 cotton duck is cemented to the upper surface of the second thin rubber layer. Another layer of rubber stock corresponding substantially to the size of the finished diaphragm and having a thickness of about 1/16 to 3/32 inch is cemented as an upper layer to the portion of the built-up diaphragm heretofore described.

A die-cut annular ring of rubber stock having a thickness of about 1/8 to 5/32 inch is cemented to the top edge portion of the diaphragm assembly in order to provide the thickened edge portion. Two die-cut portions of rubber stock conforming in general to the cross-sectional shape of the upright portion 15 and having a thickness of about 1/8 to 5/32 inch are cemented to the upper surface of the diaphragm assembly at the positions to be occupied by the uprights 15. The uprights 15 are produced by piling two or more blocks of rubber stock on the aforementioned die-cut portions, the topmost block having a die-cut hole 22 therethrough. One or more plies 23 of unbalanced duck are cemented onto the assembled blocks so that the tie cords of the duck run in the same direction as the holes 22 and the tensile cords run around the outside walls of the blocks which are parallel to the hole walls. The duck is then capped with a layer of thick rubber stock which is cemented to the duck.

The entire diaphragm assembly is placed in a mold and cured under suitable time-temperature-pressure conditions to produce a vulcanized diaphragm of the shape shown and described.

If desired for additional strength a metallic reinforcing member 24 punched and shaped to fit over the upright 15 with a hole 25 in alignment with hole 22 may be bonded to the top and inner face of each upright 15. The bottom 26 of member 24 stops some distance above the upper surface of strip portion 12 in order to avoid the possibility of the member 24 cutting the upper surface of the diaphragm when in compression.

The diaphragm is preferably molded in the closed position for the purpose of utilizing the molded or relaxed position of the diaphragm during the time of valve closure, and then only at, and during, the time of valve opening is the diaphragm under stress or deformed from its normally molded position. Further, the molded-closed position facilitates ease of assembling the diaphragm in the finished valve, and assures proper seating and pressure tightness which, as has been determined from experience, is more difficultly obtained and maintained where the diaphragm is molded in the reverse or open position.

Figure 6:
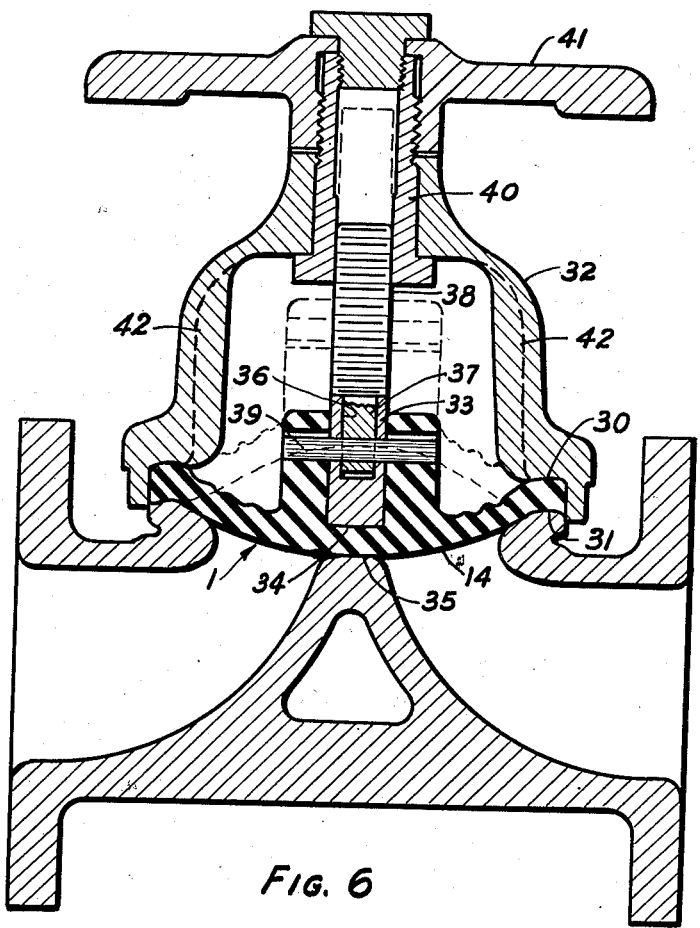
Figure 6 is a vertical cross-section of a valve in accordance with my invention in closed position.
Figure 4:
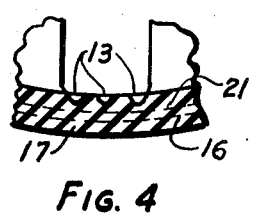
Figure 4 is a cross-section of part of the diaphragm taken along the line 4—4 of Figure 2.
Figure 7:
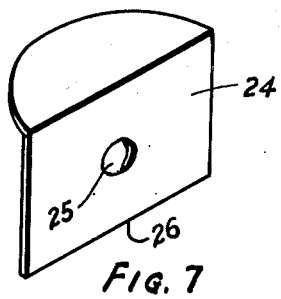
Figure 7 is a perspective view of a metallic reinforcing element used in conjunction with the diaphragm.
Figure 5:
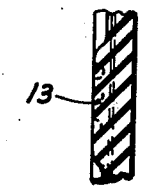
Figure 5 is a partial cross-section of the diaphragm taken along the line 5—5 of Figure 1.

As shown in Figure 6 the diaphragm 1 is adapted to be clamped between the machined opposing flanges 30 and 31 of bonnet and body members 32 and 33, respectively. The flanges 30 and 31 are inclined and rounded to receive the inclined edge portion 6, 7 of the diaphragm and form a positive lock on the edge portion of the diaphragm when the mating flanges are pulled together by means of bolts or other clamping means. The perpendicular compressive force of these flanges and their resultant component forces then cause the flexible material to be compressed and deformed away from the direction of compressive load, with the rubber or synthetic material flowing or deforming until the bolting stress or compressive stress has finally arrived at its maximum value. This phenomena is well-known in the technology of rubber and similar material and is a basic function of the rheology of such materials.

However, the edge portion 6, 7 is confined between these flanges as illustrated in Figure 6, and the relieved area 8 then tends to form a base or reservoir in which this compressive load can be expended to some degree so that the rubber will flow into this area, and yet a positive lock will be maintained between the flanges of the valve components without excessive deformation or flow taking place inwardly towards the first semi-circular flute, or corrugation 11.

However, some plastic flow will take place around the circumference of the diaphragm with this flow acting in a linear displacement towards the geometrical center of the diaphragm. The initial flue 11 is of substantially less thickness than the area lying on either side thereof, so that the residual plastic flow or cold flow of the stock that has initially taken place between the body and bonnet flanges, then permits the flow of this residual stock into the area of this flute. Such flow does deform the contour of the initial flute, and successively deforms the remainder of the flutes 11 until the last flute is reached adjacent the upright columns 15. In this way, the successive flutes are designed to take the residual flow of stock, or volume of material compressed, away from the periphery of the diaphragm, and also compressed away from the center bar or portion of the diaphragm when the diaphragm is closed upon the weir.

A compressor bar 33 fits in the slot between the upright sections 15. The length of the bar 33 is substantially the same as that of strip 12 and the contour of the lower surface 34 of the bar conforms to the contour of the surface of weir 35 in order to hold the diaphragm in leak-proof relationship with the weir when in closed position. The center of bar 33 lying between uprights 15 is substantially flat and extends above the upper surface of uprights 15. Bar 33 has a bore 36 extending from the middle top thereof toward the bottom in order to loosely accommodate the lower end 37 of stem 38. The lower end of stem 38 and the bar 33 have horizontal passageways therethrough in alignment with holes 22 in the upright sections 15. The diaphragm, depressor bar and stem are held together in assembled relation by pin 39 which slides easily in holes 22 but fits tightly in the stem passageway. The valve is equipped with a conventional rotatable sleeve 40 into which stem 38 is threaded, and handwheel 41 to operate the diaphragm from closed to open positions. The dotted lines in Figure 6 show the position of the diaphragm in fully open position. The bonnet 32 has recesses or guideways 42 on the inner surface in which the opposite ends of compressor bar 33 are adapted to slide.

The diaphragm is formed with two markers 43 (Figure 1) recessed molded on the wet face of the diaphragm and adapted to be registered with markers on the sides of flange 31 in order that the diaphragm shall be properly placed in the valve with the strip 12 lying directly over weir 35.

The undulating, corrugated or relieved upper portion of the diaphragm permits mechanical movement of the diaphragm and compression of the diaphragm between the flange assembly faces with reduced detrimental action or effect from inherent cold flow or plastic deformation characteristic of flexible materials such as rubber and synthetic elastomers. It has already been pointed out how the relieved sections of the diaphragm assist in alleviating the harmful effects caused by cold flow and plastic deformation resulting from the compression of the edge portion of the diaphragm between the opposing bonnet and body flanges. The relieved portions of the diaphragm also function in the same manner to relieve cold flow and plastic deformation caused by the compression action of the compressor bar against the valve weir.

When the valve diaphragm is closed on the weir, the bar-shaped compressor will compress the diaphragm between the compressor surface and the valve weir, so that this diaphragm section is then trapped and compressed between these two contoured metal surfaces as illustrated in Figure 6. The compression of this flexible material then requires that some means be provided as a take-up to absorb this rubber stock under plastic flow and in turn relieve the compressive strains and distortion resulting in self-destruction of the diaphragm if provision is not made for their satisfactory distribution and relief of plastic flow and stress in critical areas. Here again the relief sections adjacent to columns 15 play their part of acting as reservoirs or points of stress relief where plastic flow can enter and permit even distribution and relaxation of stress to some extent without disrupting the interior of the diaphragm and the continuation of self-destructive forces. Both the flutes 11 lying adjacent to uprights 15 and the recesses 13 act as reservoirs in which the plastic and flexible stock will flow under compression and away from the compressed area beneath the bar compressor and valve weir. The recesses 13 are considerably reduced in size by means of absorption of the plastic flow as the volume of rubber stock is compressed into this available space. Thus, whether the play of compressive forces and resulting plastic flow is from the periphery of the diaphragm to the center or, vice versa, the properly proportioned and spaced relieved areas will serve their function.

Figure 2:
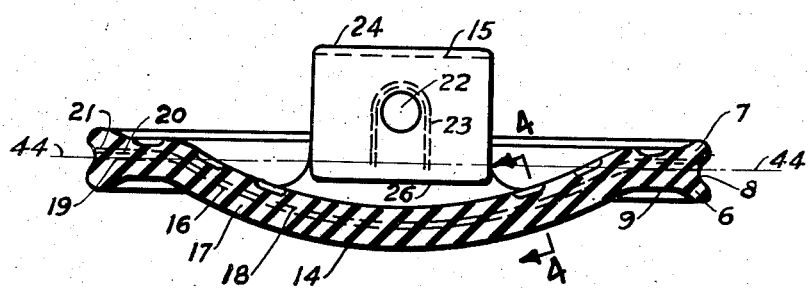
Figure 2 is a cross-section of the diaphragm taken along the line 2—2 of Figure 1.
Figure 3:
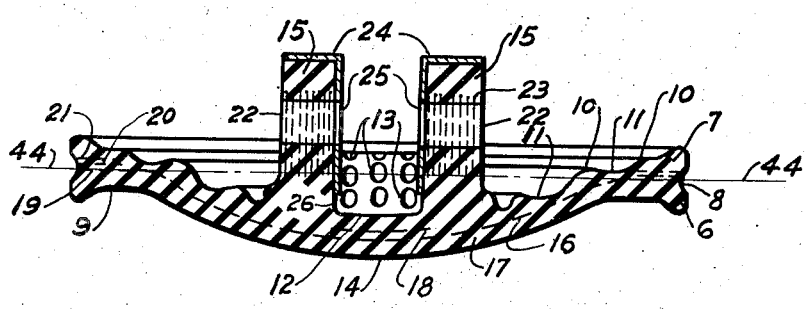
Figure 3 is a cross-sectional view taken along the line 3—3 of Figure 1.

These corrugations and relief sections also play an additional part when the diaphragm is opened, closed, or at partial stroke, in order to permit throttling flow of fluid through the valve. Figures 2 and 3 show the molded, closed position of the diaphragm. This position is reversed during opening, or the entire bowl portion of the diaphragm is drawn upward by the aforementioned bar compressor and pin assembly attached through holes 22 of columns 15. As this heavy section moves upward, we must then allow for the problem of passing the stock through a planer area along center line 44 which is smaller than the area normally occupied by the bowl portion of the diaphragm. In other words, we must take a hemispherical shaped section, and distort it and bend it sufficiently to force it through a circular area and plane along the neutral axis 44. When this action takes place the semicircular shaped reliefs or flutes 11 again come into play to permit easier deformation of the rubber material with plastic flow taking place from the geometric center outwardly as the diaphragm is drawn up, and with this plastic flow being successively absorbed by these flutes. In turn, recesses 13 are relieved from compression underneath the compressor surface as the valve is being opened and the compressor rises upwardly, so that plastic flow and compression are reduced in recesses. However, as the diaphragm moves upward, these recesses also act as small reservoirs or space where the deformation of the rubber stock may take place without destructive buckling or crinkling action.

Because of the necessity of reinforcing the diaphragm with fabric plies it is not practicable to form the diaphragm with both upper and lower surfaces fluted. However, I have found that fluting or corrugating only the upper surface effectively relieves the stresses set up in the diaphragm due to compressive forces.

It will be seen therefore that by the unique construction of this diaphragm that I am able to secure proper function and improved service life from diaphragms of this nature when molded of rubber, synthetic elastomers, and other materials, and by this design to properly proportion, allow for, and usefully direct compressive forces and plastic flow and distortion, and to accomplish an improved method of attachment of the diaphragm to the required actuating compressor, so that the entire diaphragm will more usefully and properly perform its intended function in the valve.

What is claimed:

1. A diaphragm having a fishtailed peripheral portion surrounding a bowl-shaped portion, one surface of said bowl-shaped portion being formed with substantially concentric corrugations except for a strip portion extending through the center of the diaphragm to the peripheral portion, and means adjacent the center of said diaphragm to enable said diaphragm to be fastened to a stem.

2. A diaphragm in accordance with claim 1 in which the upper surface of the bowl-shaped portion is corrugated and the lower surface of said diaphragm is substantially smooth.

3. A diaphragm in accordance with claim 1 in which the upper surface of said strip portion is formed with a series of spaced recessed areas lying between said corrugations.

4. A valve diaphragm comprising a fishtailed peripheral portion surrounding a bowl-shaped portion, the upper surface of said bowl-shaped portion being formed with a plurality of concentric flutes separated by a strip portion having a substantially smooth lower surface running through the center of the diaphragm and extending to said edge portion, spaced upright portions on either side of said strip portion at the center of said diaphragm, said upright portions having horizontal aligned holes therethrough.

5. A valve diaphragm in accordance with claim 4 in which the lower surface thereof is substantially smooth.

6. A valve diaphragm in accordance with claim 4 in which the lower surface is substantially smooth and the upper surface of said strip portion is substantially smooth except for plurality of spaced depressions lying between said flutes.

7. A flexible, fabric-reinforced elastomer diaphragm having a peripheral portion surrounding a bowl-shaped portion, one surface of said bowl-shaped portion being formed with substantially concentric corrugations except for a strip portion extending through the center of the diaphragm to said peripheral portion, means adjacent the center of said diaphragm and on the same surface as said corrugations to enable said diaphragm to be fastened to a stem, the opposite surface of said diaphragm being substantially smooth.

8. A flexible, fabric-reinforced elastomer diaphragm having a thickened edge portion and a bowl-shaped center portion, one surface of which is substantially smooth and the opposite surface of which is formed with concentric undulations, said undulations being interrupted by a strip portion extending through the center of said diaphragm from opposite points on the edge of said bowl-shaped portion and means on said opposite face adjacent the center thereof to enable said diaphragm to be fastened to a stem.

9. A flexible fabric-reinforced elastomer diaphragm having a thick fishtailed peripheral portion with a dished edge surrounding a bowl-shaped portion, the area of juncture between said peripheral portion and said bowl-shaped portion being thinner than said peripheral portion and the bowl-shaped portion immediately adjacent thereto.

10. A valve diaphragm in accordance with claim 4 in which metallic reinforcing elements are bonded to the surface of said uprights, said elements extending over the top of said upright and along at least one surface through which said holes pass and having holes aligned with the holes in said uprights.

11. A valve diaphragm of reinforced elastomer having at least one centrally disposed upright portion molded integrally as part of the diaphragm, a metallic reinforcing element bonded to the surface of said portion, said element extending over the top of said portion and along an upstanding surface thereof, said portion having a transverse hole therethrough in alignment with a hole in said element.

12. A valve diaphragm in accordance with claim 8 in which the means to enable the diaphragm to be fastened to a stem comprises opposing upright portions on either side of said strip portion, located at the center of the diaphragm and bonded by the innermost undulations and horizontal aligned holes in said upright portions.

13. A diaphragm valve comprising a body and a bonnet with a diaphragm therebetween, a pair of thick, reinforced spaced upright portions at the center of said diaphragm formed integrally therewith and forming a slot therebetween, a weir in said body beneath said diaphragm, a rigid depressor bar aligned with said weir and fitting in said slot between said upright portions, the length of said bar being substantially equal to the distance across the center of the unclamped portion of the diaphragm and the bottom of which conforms to the contour of the upper surface of said weir, a bore extending into said bar from the top thereof, a stem extending into said bore, transverse holes in said upright portions, bar and stem aligned with each other, a rigid pin extending through said holes to hold said stem, bar and diaphragm together and means to operate said stem.

14. A diaphragm valve in accordance with claim 13 in which the peripheral portion of the diaphragm is fishtailed and clamped between opposing inclined body and bonnet flanges, the diaphragm has a substantially smooth surfaced strip immediately overlying the valve weir, and the upper face of the portion of the diaphragm between the peripheral portions and strip is fluted in the form of concentric arcs to give a series of alternate thick and thin areas.

15. In combination with a valve having an upstanding weir across the passageway thereof, a compressor bar above said weir, and means for moving said bar to and from said weir, a diaphragm between said weir and said bar, the edge portion of said diaphragm being securely held between the closing faces of said valve, said diaphragm having a bowl-shaped portion lying inside said edge portion, said bowl-shaped portion having its outer side formed with a series of concentric alternate crests and hollows interrupted by a strip extending through the center of the diaphragm to its edge portion with small hollows underlying the bar compressor location area, the hollows and crests being below the plane of the clamped edge when the valve is in the closed position, said diaphragm being formed with reinforced, spaced twin columns adjacent the center to form a slot in which said bar compressor lies and to which column the bar is fastened, the entire surface of the diaphragm on the liquid side being smooth and continuous throughout the diaphragm bowl.

References Cited in the file of this patent

UNITED STATES PATENTS

| Number | Name | Date |
|---|---|---|
| 63,648 | Matthews | Apr. 9, 1867 |
| 785,116 | Perry | Mar. 21, 1905 |
| 1,288,389 | Deegan | Dec. 17, 1918 |
| 1,783,281 | Cox | Dec. 2, 1930 |
| 1,853,156 | Sobon | Apr. 12, 1932 |
| 2,242,582 | Jenick | May 20, 1941 |
| 2,283,369 | Jacobson | May 19, 1942 |
| 2,397,373 | Saunders | Mar. 26, 1946 |

FOREIGN PATENTS

| Number | Country | Date |
|---|---|---|
| 614,351 | Germany | 1935 |
| 560,633 | Great Britain | 1944 |
| 684,106 | France | 1930 |